US009255638B2

(12) United States Patent
Yamawaki et al.

(10) Patent No.: US 9,255,638 B2
(45) Date of Patent: Feb. 9, 2016

(54) DEVICE FOR CONTROLLING AUTOMATIC TRANSMISSION

(71) Applicants: JATCO LTD, Fuji-shi, Shizuoka (JP); NISSAN MOTOR CO., LTD., Yokohama-shi, Kanagawa (JP)

(72) Inventors: Morimasa Yamawaki, Tokyo (JP); Tatsuya Hayashi, Tokyo (JP); Yuzuru Tohta, Sagamihara (JP)

(73) Assignees: JATCO LTD, Fuji-Shi, Shizuoka (JP); NISSAN MOTOR CO., LTD., Yokohama-Shi (JP)

( * ) Notice: Subject to any disclaimer, the term of this patent is extended or adjusted under 35 U.S.C. 154(b) by 77 days.

(21) Appl. No.: 14/358,632

(22) PCT Filed: Nov. 5, 2012

(86) PCT No.: PCT/JP2012/078570
§ 371 (c)(1),
(2) Date: May 15, 2014

(87) PCT Pub. No.: WO2013/073394
PCT Pub. Date: May 23, 2013

(65) Prior Publication Data
US 2015/0006047 A1    Jan. 1, 2015

(30) Foreign Application Priority Data
Nov. 18, 2011  (JP) .................................. 2011-252514

(51) Int. Cl.
*F16H 61/14*     (2006.01)
*F16H 61/02*     (2006.01)
*B60W 10/02*     (2006.01)
*B60W 10/11*     (2012.01)

(52) U.S. Cl.
CPC ........... *F16H 61/0204* (2013.01); *B60W 10/02* (2013.01); *B60W 10/11* (2013.01); *F16H 61/14* (2013.01)

(58) Field of Classification Search
None
See application file for complete search history.

(56) References Cited

U.S. PATENT DOCUMENTS

| 5,976,055 | A | * | 11/1999 | Sasaki | F16H 61/14 |
|---|---|---|---|---|---|
| | | | | | 477/176 |
| 6,039,675 | A | * | 3/2000 | Adachi | F16H 61/143 |
| | | | | | 477/169 |
| 8,548,704 | B2 | | 10/2013 | Oue et al. | |
| 2004/0229728 | A1 | * | 11/2004 | Oshima | F16H 61/143 |
| | | | | | 477/176 |
| 2009/0164078 | A1 | | 6/2009 | Oue et al. | |
| 2009/0248266 | A1 | * | 10/2009 | Oue | F16H 61/143 |
| | | | | | 701/68 |

FOREIGN PATENT DOCUMENTS

| JP | 06-174075 A | 6/1994 |
|---|---|---|
| JP | 2009-150494 A | 7/2009 |

* cited by examiner

*Primary Examiner* — Edwin A Young
(74) *Attorney, Agent, or Firm* — Foley & Lardner LLP

(57) ABSTRACT

The object of the invention is to impart a suitable target slip amount depending on a state of change in an output from a driving power source to a torque converter, while simplifying control. A controller has a calculation part for calculating an engine torque change rate that is a rate of change in the output, and a target slip addition amount calculation part for calculating a negative value as an addition amount, when the engine torque change rate is less than or equal to a predetermined value that is a positive value, and for calculating a positive value as the addition amount, when the engine torque change rate is greater than the predetermined value. The controller is configured to set the target slip amount of a lockup clutch by arithmetic processing that integrates the addition amount, determined based on the calculated engine torque change rate, every control period.

8 Claims, 4 Drawing Sheets

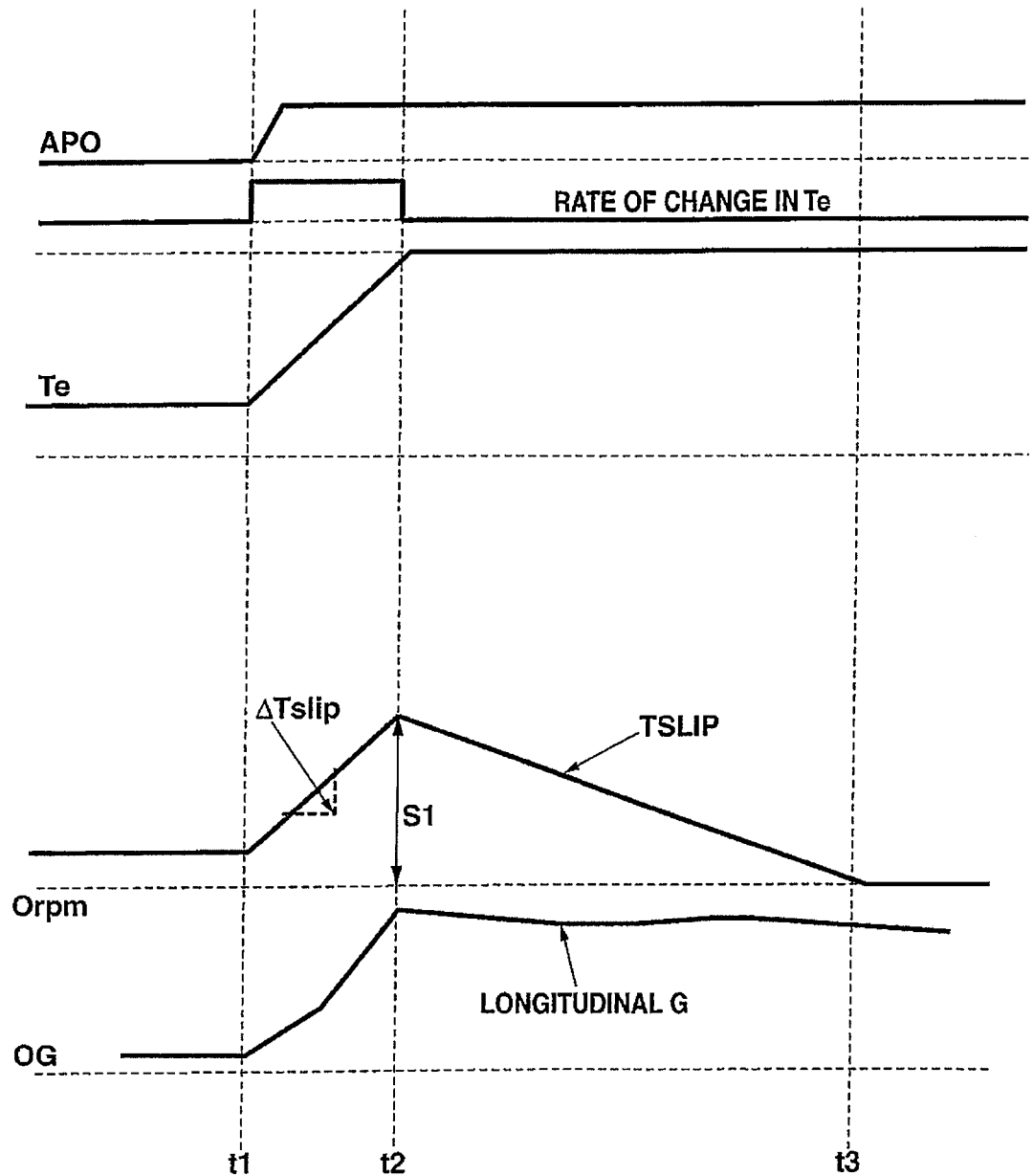

DEVICE FOR CONTROLLING AUTOMATIC TRANSMISSION

TECHNICAL FIELD

The present invention relates to a device for controlling an automatic transmission configured to execute slip lockup control that makes a slip amount of a lockup clutch coincide with a target slip amount.

BACKGROUND ART

Conventionally, in a device for controlling an automatic transmission configured to execute slip lockup control by which a slip amount of a lockup clutch is brought to a target slip amount, when a rate of change in a required load for an engine is greater than or equal to a predetermined threshold value, the target slip amount is increased at a predetermined rate of increase, and then the increased target slip amount is decreased at a predetermined rate of decrease. At this time, the predetermined rate of decrease is set to decrease, as the operating condition when the rate of change in the required load has reached or exceeded the predetermined threshold value approaches an operating condition in which a rate of increase in a rotational speed on the automatic-transmission side of a torque converter with respect to an increase in the required load is low. Such a slip lockup control device is well known and set forth in Patent document 1, for example.

CITATION LIST

Patent Literature

Patent document 1: Japanese patent provisional publication No. 2009-150494 (A)

SUMMARY OF INVENTION

Technical Problem

However, in the prior art automatic transmission slip lockup control device, a rate of increase (a gradient) in a target slip amount is set depending on a vehicle speed when a variation of the throttle opening becomes greater than a predetermined variation. Therefore, a transient state of an engine load change, for example, an accelerator operation state such that the accelerator is further moderately depressed after having been rapidly depressed, is not taken into account. Thus, there is a problem that this results in a shock and a speed flare-up.

It is, therefore, in view of the previously-described drawbacks of the prior art, an object of the invention to provide an automatic transmission control device capable of imparting a suitable target slip amount depending on an output from a driving power source to a torque converter, while simplifying control.

Solution to Problem

In order to accomplish the aforementioned and other objects, according to the present invention, there is provided a device for controlling an automatic transmission employing a torque converter interposed between a driving power source of a vehicle and an automatic transmission, a lockup clutch provided to permit a driving-power-source side of the torque converter to engage with an automatic-transmission side of the torque converter, and a slip lockup control means for executing control by which an actual slip amount of the lockup clutch corresponding to a rotational speed difference between the driving-power-source side and the automatic-transmission side is brought to a target slip amount.

In the previously-discussed control device of the automatic transmission, also provided is a target slip addition amount calculation means.

The target slip addition amount calculation means is configured to calculate a negative value as an addition amount of the target slip amount, when a rate of change in an output from the driving power source to the torque converter is less than or equal to a predetermined value that is a positive value. Conversely when the rate of change in the output is greater than the predetermined value, the target slip addition amount calculation means calculates a positive value as the addition amount.

The slip lockup control means is configured to set the target slip amount of the lockup clutch by arithmetic processing that integrates the addition amount, determined based on the rate of change in the aforementioned output, every control period.

Advantageous Effects of Invention

Hence, within the target slip addition amount calculation means, when a rate of change in an output from the driving power source to the torque converter is less than or equal to a predetermined value that is a positive value, a negative value is calculated as an addition amount of the target slip amount. Conversely when the rate of change in the output from the driving power source to the torque converter is greater than the predetermined value, a positive value is calculated as the addition amount. Additionally, within the slip lockup control means, the target slip amount of the lockup clutch is set by arithmetic processing that integrates the addition amount, determined based on the rate of change in the aforementioned output, every control period.

For instance, when the accelerator is rapidly depressed (that is, a rate of change in the output from the driving power source to the torque converter>the predetermined value), a positive value is calculated as an addition amount with the result that the target slip amount gradually increases. Subsequently, when the depressed state of the accelerator is maintained (that is, a rate of change in the output from the driving power source to the torque converter≤the predetermined value), a negative value is calculated as an addition amount with the result that the target slip amount gradually decreases. That is, the target slip amount, which is periodically set, reflects a transient state of a change in the output from the driving power source to the torque converter, thus imparting a suitable target slip amount that suppresses a shock and a speed flare-up from occurring.

In calculating the addition amount of the target slip amount, an addition amount (a positive value or a negative value) of the target slip amount is calculated every change rate in the output from the driving power source to the torque converter. Hence, it is unnecessary to set a rate of increase of the target slip amount and a rate of decrease of the target slip amount separately from each other, and thus control can be simplified.

As a result of this, it is possible to impart a suitable target slip amount depending on a state of change in the output from the driving power source to the torque converter, while simplifying control.

BRIEF DESCRIPTION OF DRAWINGS

FIG. 5 is a time chart illustrating each characteristic of an accelerator opening (APO), an engine torque change rate (a rate of change in engine torque Te), a target slip amount, and a longitudinal acceleration (G), in the automatic transmission control device of the first embodiment, when the depressed state of the accelerator is maintained after having been rapidly depressed.

DESCRIPTION OF EMBODIMENTS

The preferred embodiments that realize the automatic transmission control device of the invention will be hereinafter described by way of the first embodiment with reference to the drawings.

First Embodiment

The configuration of the automatic transmission control device of the first embodiment will be divided into two configurations, one being [ENTIRE SYSTEM CONFIGURATION] and the other being [SLIP LOCKUP CONTROL CONFIGURATION], and hereunder explained in detail.

[Entire System Configuration]

Figure 1:
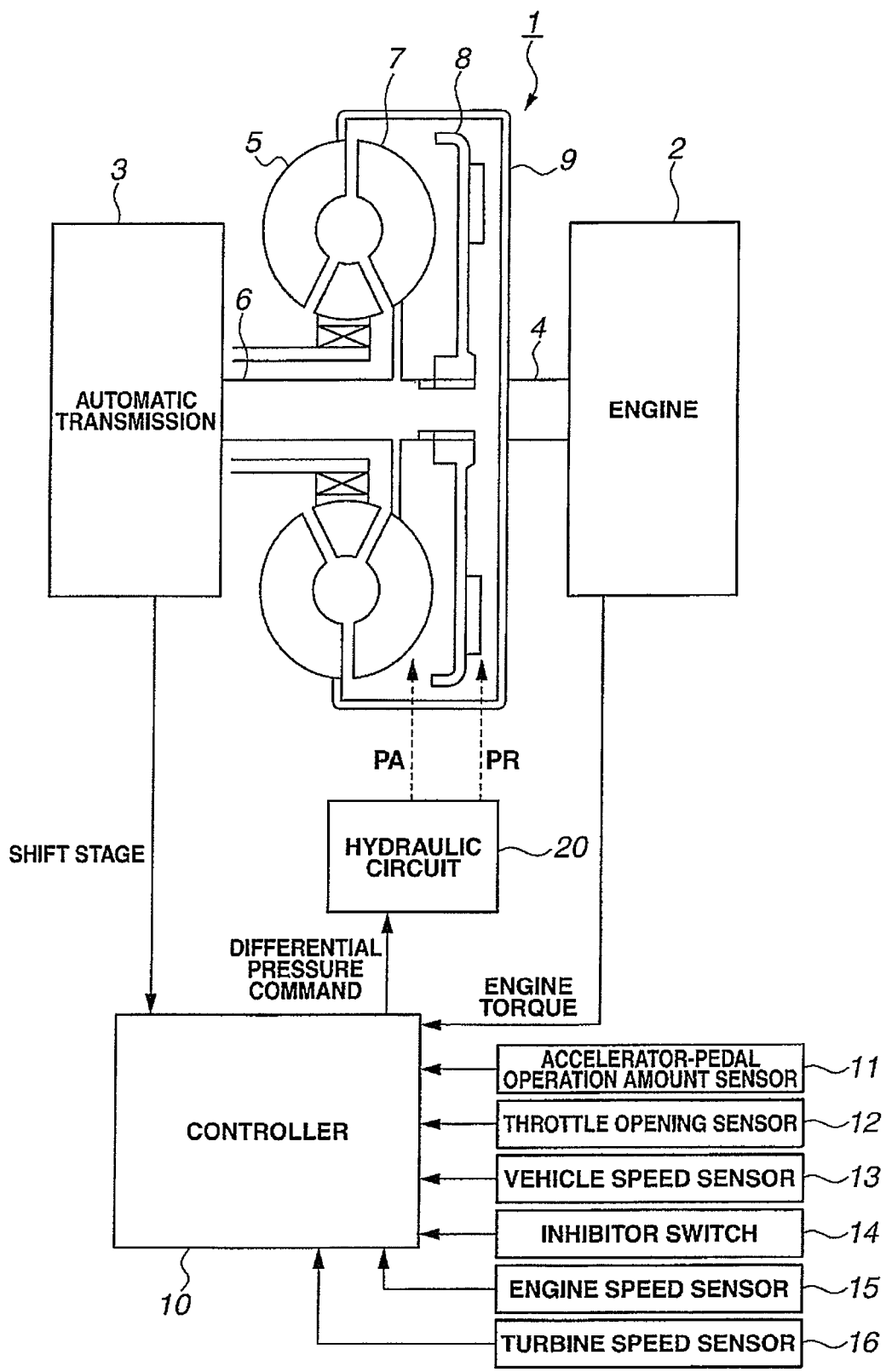
FIG. 1 is an entire system configuration diagram illustrating an engine drive system and a control system to which an automatic transmission control device of the first embodiment has been applied.

Referring now to FIG. 1, there is shown an engine drive system and a control system to which the automatic transmission control device of the first embodiment has been applied. The entire system configuration is hereunder described with reference to FIG. 1.

As shown in FIG. 1, the engine drive system, to which the automatic transmission control device of the first embodiment has been applied, is provided with a torque converter 1, an engine 2 (a driving power source), an automatic transmission 3, and a lockup clutch 8.

Torque converter 1 is interposed between the engine 2 and the automatic transmission 3, for transmitting a driving force of engine 2 through a fluid to the automatic transmission 3. In the torque converter 1, a pump impeller 5 and a turbine runner 7 are arranged to be opposed to each other. The pump impeller is connected to an output shaft 4 of engine 2, whereas the turbine runner is connected to an input shaft 6 of automatic transmission 3. When the pump impeller 5 is rotating by rotation of engine 2, a fluid (ATF), with which the internal space of torque converter 1 is filled, flows, thus causing the turbine runner 7 to rotate.

The previously-discussed lockup clutch 8 is connected to the input shaft 6 of automatic transmission 3 so as to rotate together with the turbine runner 7. The lockup clutch is located in a front cover 9, which is connected to the output shaft 4 of engine 2 and formed integral with the pump impeller 5. When the lockup clutch 8 is brought into engagement with the pump impeller 5, input and output elements of torque converter 1 are directly coupled with each other and hence relative rotation between them becomes zero, thus achieving a completely locked-up state. Also, with the input and output elements kept in a half-engaged state, a slip lock-up state where there is a slip between the input and output elements takes place. Conversely when the lockup clutch 8 is completely released, an unlock-up state occurs.

The previously-discussed lockup clutch 8 is configured to operate depending on the differential pressure between a torque-converter apply pressure PA and a torque-converter release pressure PR, respectively acting on both side faces of the lockup clutch. When the release pressure PR is higher than the apply pressure PA, the lockup clutch is released. Conversely when the release pressure PR is lower than the apply pressure PA, the lockup clutch is engaged. A transmittable torque of lockup clutch 8 of torque converter 1, determined depending on an engagement force of lockup clutch 8, that is, a lockup clutch engagement capacity is determined by the previously-noted differential pressure.

As shown in FIG. 1, the control system, to which the automatic transmission control device of the first embodiment has been applied, is provided with a controller 10, an accelerator-pedal operation amount sensor 11, a throttle opening sensor 12, a vehicle speed sensor 13, an inhibitor switch 14, an engine speed sensor 15, a turbine speed sensor 16, and a hydraulic circuit 20.

Controller 10 calculates a target slip amount, corresponding to a target rotational speed difference between the input and output elements of torque converter 1, and then controls the differential pressure between torque-converter apply pressure PA and torque-converter release pressure PR. As the target slip amount increases, the differential pressure is decreased so as to reduce the engagement force of lockup clutch 8. Controller 10 is also configured to calculate the target slip amount based on an input torque from the engine 2, serving as the driving power source, to the torque converter 1, that is, an engine torque. Controller 10 is further configured to calculate a differential pressure command value by feedback control based on a deviation between the calculated target slip amount and an actual slip amount (the speed difference between engine speed Ne and turbine speed Nt), and impart or instruct the differential pressure command value to the hydraulic circuit 20 that controls or regulates a supply hydraulic pressure to lockup clutch 8. By the way, slip lockup control is not executed in any gear range except a D range and an M range.

[Slip Lockup Control Configuration]

Figure 2:
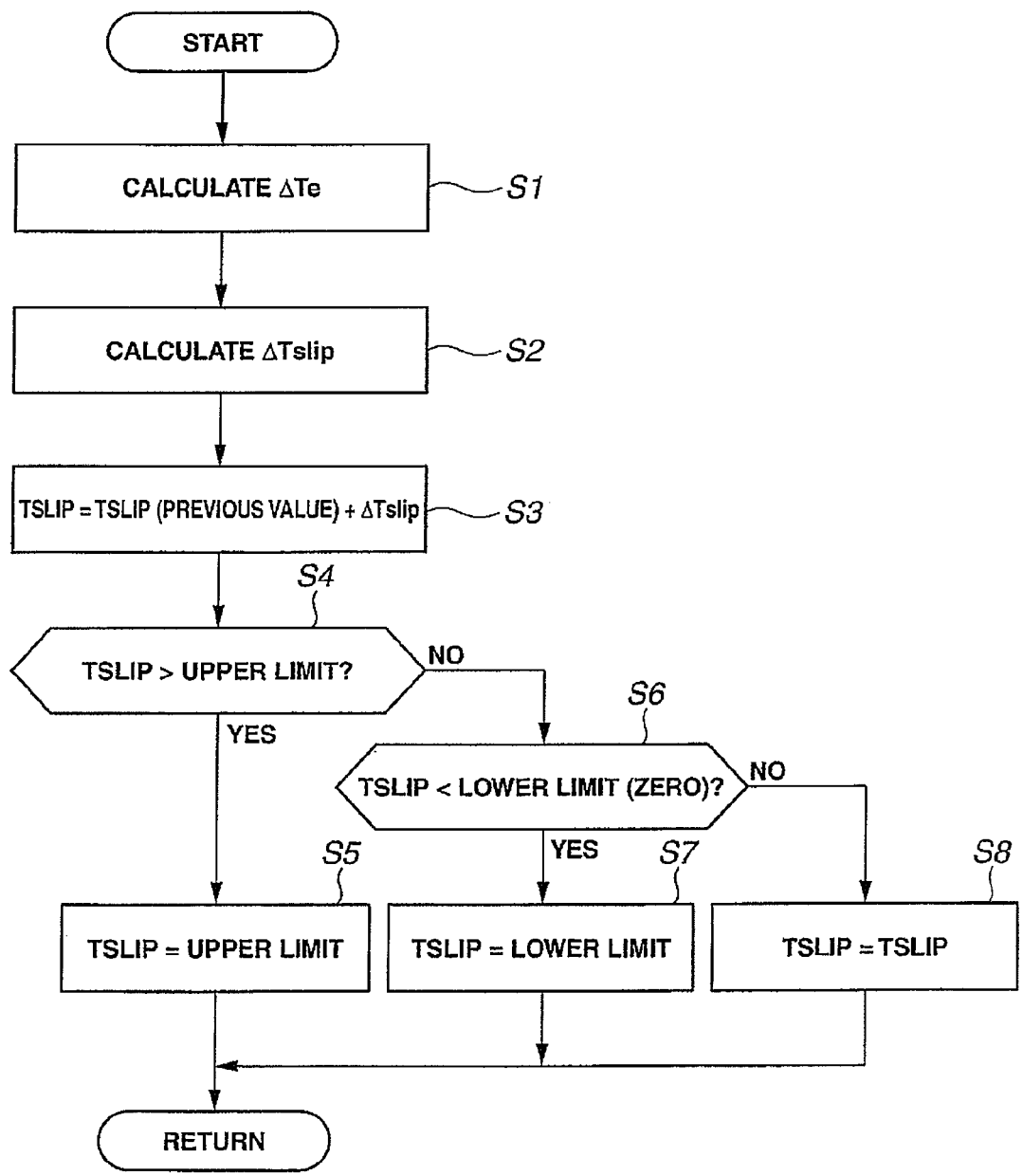
FIG. 2 is a flowchart illustrating a flow of slip lockup control processing executed within a controller incorporated in the automatic transmission control device of the first embodiment.

FIG. 2 shows the flow of slip lockup control processing executed within the controller 10 of the first embodiment (a slip lockup control means). Each step of FIG. 2, representing the slip lockup control configuration, will be hereunder explained.

At step S1, a rate of change $\Delta Te$ in engine torque (i.e., a rate of change in the output from the driving power source (engine 2) to the torque converter 1) is calculated by differentiating the inputted engine torque Te with respect to time, corresponding to the control period. Then, the routine proceeds to step S2.

Subsequently to arithmetic calculation of the rate of change $\Delta Te$ in engine torque at step S1, at step S2 an addition amount $\Delta Tslip$ of a target slip amount TSLIP is calculated every engine torque change rate $\Delta Te$ by the use of the addition amount map of FIG. 3, and then the routine proceeds to step S3 (a target slip addition amount calculation means).

Figure 3:
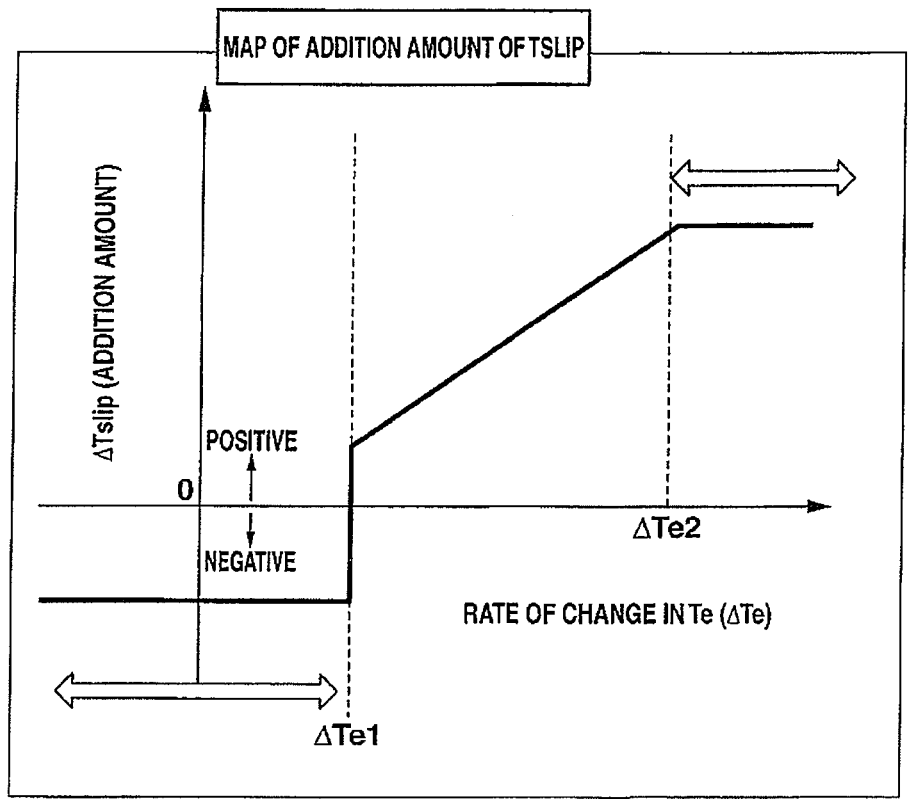
FIG. 3 is an addition amount map showing one example of a characteristic of an addition amount of a target slip amount with respect to a rate of change in engine torque used for slip lockup control processing of the first embodiment.

As seen from the addition amount map of FIG. 3, a first predetermined value $\Delta Te1$ and a second predetermined value $\Delta Te2$ greater than the first predetermined value $\Delta Te1$ are both set in the positive area of the engine torque change rate $\Delta Te$. When the engine torque change rate is less than or equal to the first predetermined value $\Delta Te1$, a negative fixed value is calculated as an addition amount $\Delta$Tslip. When the engine torque change rate $\Delta$Te exists between the first predetermined value $\Delta$Te1 and the second predetermined value $\Delta$Te2, a positive value that increases in proportion to an increase in the engine torque change rate $\Delta$Te is calculated as an addition amount $\Delta$Tslip. When the engine torque change rate $\Delta$Te is greater than or equal to the second predetermined value $\Delta$Te2, a maximum value that is a positive fixed value is calculated as an addition amount $\Delta$Tslip. Briefly, speaking, when the engine torque change rate $\Delta$Te is positive and less than or equal to the first predetermined value $\Delta$Te1, a negative value is calculated as an addition amount $\Delta$Tslip. Conversely when the engine torque change rate $\Delta$Te is greater than or equal to the first predetermined value $\Delta$Te1, a positive value is calculated as an addition amount $\Delta$Tslip.

Subsequently to arithmetic calculation of the addition amount $\Delta$Tslip at step S2, at step S3 the current (latest up-to-date) target slip amount TSLIP is calculated by adding the addition amount $\Delta$Tslip to the previous value of target slip amount TSLIP, that is, by arithmetic processing that integrates the addition amount $\Delta$Tslip every control period, and then the routine proceeds to step S4.

Subsequently to arithmetic calculation of the target slip amount TSLIP at step S3, at step S4 a check is made to determine whether the calculated target slip amount TSLIP exceeds its upper limit. When the answer is in the affirmative (YES), that is, when TSLIP>upper limit, the routine proceeds to step S5. Conversely when the answer is in the negative (NO), that is, when TSLIP≤upper limit, the routine proceeds to step S6.

As discussed above, the upper limit for target slip amount TSLIP of lockup clutch 8 is provided or prescribed. The upper limit is set to increase, as engine torque Te (i.e., the output from engine 2 to torque converter 1) increases.

Subsequently to the decision TSLIP>upper limit, made at step S4, at step S5 target slip amount TSLIP is determined as the upper limit, which is set depending on the magnitude of engine torque Te, and then the routine advances to RETURN.

Subsequently to the decision TSLIP≤upper limit, made at step S4, at step S6 a check is made to determine whether the calculated target slip amount TSLIP is less than its lower limit. When the answer is in the affirmative (YES), that is, when TSLIP<lower limit, the routine proceeds to step S7. Conversely when the answer is in the negative (NO), that is, when TSLIP≥lower limit, the routine proceeds to step S8.

As discussed above, the lower limit for target slip amount TSLIP of lockup clutch 8 is provided or prescribed. The lower limit is set to zero.

Subsequently to the decision TSLIP<lower limit, made at step S6, at step S7 target slip amount TSLIP is determined as the lower limit (=0), and then the routine advances to RETURN.

Subsequently to the decision TSLIP≥lower limit, made at step S6, at step S8 target slip amount TSLIP is determined as the target slip amount TSLIP calculated at step S3, and then the routine advances to RETURN.

The operation is hereunder explained.

The operation/action of the automatic transmission control device of the first embodiment will be divided into three actions, namely, [TARGET SLIP AMOUNT SETTING ACTION], [SLIP LOCKUP CONTROL ACTION DURING ACCELERATOR DEPRESSING OPERATION], and [UPPER AND LOWER LIMITS SETTING ACTION FOR TARGET SLIP AMOUNT], and hereunder explained in detail.

[Target Slip Amount Setting Action]

Figure 4:
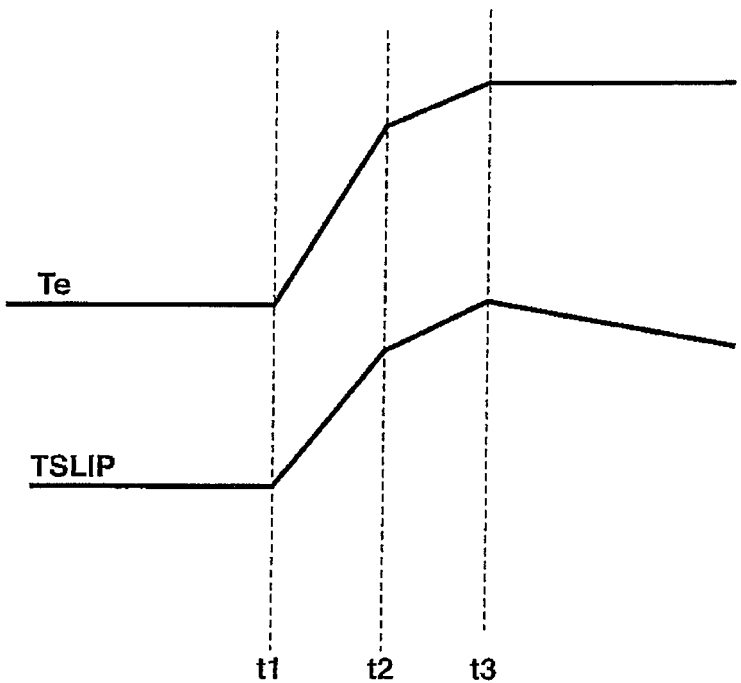
FIG. 4 is a time chart illustrating a characteristic of a change in the target slip amount during slip lockup control of the first embodiment in the presence of an engine torque change such that the engine torque is rapidly increased, moderately increased, and then maintained constant.

When watching the driver's accelerator operation during driving, a scene, where the accelerator depressing speed is transiently changed, is frequently occurring. In this manner, in the case that the accelerator depressing speed is transiently changed, it is necessary to set a suitable target slip amount suited for such a transient change. Target slip amount setting action such that this need is reflected is hereunder explained with reference to FIG. 4.

For instance, assuming that the accelerator is further depressed moderately after having been rapidly depressed, and then the accelerator is maintained constant, engine torque Te changes in accordance with the accelerator operation. That is, as seen from the Te characteristic of FIG. 4, engine torque Te rises at a steep gradient during the time interval from the time t1 to the time t2, and further rises at a moderate gradient during the time interval from the time t2 to the time t3. Thereafter, that is, after the time t3, engine torque Te is maintained constant (at the engine torque inputted at the time t3).

Therefore, in the flowchart of FIG. 2, the routine proceeds from step S1 to step S2. Hence, at step S2, an addition amount $\Delta$Tslip of target slip amount TSLIP is calculated, but arithmetic calculation of addition amount $\Delta$Tslip is concretely performed as follows. During the time interval from the time t1 to the time t2, addition amount $\Delta$Tslip becomes a large positive value, because of a high engine torque change rate $\Delta$Te, for example, a value close to the second predetermined value $\Delta$Te2. During the time interval from the time t2 to the time t3, addition amount $\Delta$Tslip becomes a small positive value, because of a low engine torque change rate $\Delta$Te, for example, a value close to the first predetermined value $\Delta$Te1. After the time t3, engine torque change rate $\Delta$Te becomes zero and thus addition amount $\Delta$Tslip becomes a negative value.

Therefore, in the flowchart of FIG. 2, the routine proceeds to step S3. In calculating the target slip amount TSLIP, as seen from the TSLIP characteristic of FIG. 4, during the time interval from the time t1 to the time t2, the addition amount $\Delta$Tslip of a large positive value is set as an incremental gradient every control period, and hence the target slip amount TSLIP rapidly increases. Then, during the time interval from the time t2 to the time t3, the addition amount $\Delta$Tslip of a small positive value is set as an incremental gradient every control period, and hence the target slip amount TSLIP moderately increases. Furthermore, after the time t3, the addition amount $\Delta$Tslip of a negative value is set as a decremental gradient every control period, and hence the target slip amount TSLIP decreases.

As discussed above, when the accelerator is depressed rapidly by the driver and hence engine torque change rate $\Delta$Te becomes large, target slip amount TSLIP rapidly increases. Subsequently to the above, when the accelerator is further depressed moderately and hence engine torque change rate $\Delta$Te becomes small, target slip amount TSLIP moderately increases. Subsequently to the above, when the accelerator depressed state is maintained and hence engine torque change rate $\Delta$Te becomes zero, target slip amount TSLIP decreases. That is, the target slip amount TSLIP, which is periodically set, finely smoothly precisely follows a transient change in engine torque change rate $\Delta$Te. As a result of this, the target slip amount, periodically set, reflects a change in the driver's accelerator operation speed.

In calculating the addition amount $\Delta$Tslip of target slip amount TSLIP, by virtue of the use of the addition amount map (see FIG. 3) from which an addition amount $\Delta$Tslip (a positive value or a negative value) of target slip amount TSLIP is calculated every engine torque change rate $\Delta$Te, it is unnecessary to set an increase rate of the target slip amount and a decrease rate of the target slip amount separately from each other. Hence, slip lockup control can be simplified.

[Slip Lockup Control Action During Accelerator Depressing Operation]

When changing a target slip amount of slip lockup control during accelerator depressing operation, it is necessary to suppress a shock and an engine speed flare-up from occurring. Slip lockup control action during accelerator depressing operation such that this need is reflected is hereunder explained with reference to FIG. 5.

At the time t1, when the accelerator stepping-on operation is made, engine torque Te rises from the time t1 to the time t2. Therefore, during the time interval from the time t1 to the time t2, the addition amount ΔTslip of a positive value, determined depending on the magnitude of engine torque change rate ΔTe, is calculated. Thus, target slip amount TSLIP increases, while the addition amount ΔTslip of a positive value is set as an incremental gradient every control period. Hence, as seen from the longitudinal-G characteristic from the time t1 to the time t2, this longitudinal-G characteristic represents an acceleration-G characteristic that the longitudinal G increases, and reflects a driver's intention for acceleration corresponding to the driver's accelerator depressing operation.

When the elapsed time has reached the time t2 at which target slip amount TSLIP reaches a peak slip amount S1, engine torque change rate ΔTe becomes zero. Thus, just after the time t2, the addition amount ΔTslip of a negative value is calculated. Thus, target slip amount TSLIP decreases, while the addition amount ΔTslip of a negative value is set as a decremental gradient every control period. Hence, as seen from the longitudinal-G characteristic from the time t2 to the time t3 at which lockup clutch 8 is brought into engagement, this longitudinal-G characteristic represents a characteristic that the longitudinal G remains almost flat, and reflects a driver's intention for acceleration-keeping corresponding to the driver's accelerator keeping operation.

When the accelerator stepping-on operation is made as discussed above, as clearly seen from the longitudinal-G characteristic of FIG. 5, there is a less rapid change in the longitudinal G, thus effectively suppressing a shock from occurring. Additionally, immediately when the peak slip amount S1 has been reached at the time t2, target slip amount TSLIP is changed to decrease. Hence, it is possible to suppress an engine speed flare-up from occurring owing to a constantly-kept target slip amount or a continuous rise in the target slip amount in a high torque range in which engine torque Te is high. In other words, the target slip amount TSLIP setting of the first embodiment means that it is possible to impart a suitable target slip amount that suppresses a shock and a speed flare-up from occurring.

[Upper and Lower Limits Setting Action for Target Slip Amount]

In the case that, in setting the target slip amount as discussed above, the target slip amount is acquired by arithmetic processing that integrates the addition amount every control period, there is a possibility that the target slip amount becomes more excessively than need be or the target slip amount becomes a negative value less than zero. For the reasons discussed above, it is necessary to set both an upper limit and a lower limit for the target slip amount. Upper and lower limits setting action for the target slip amount such that this need is reflected is hereunder explained with reference to FIG. 2.

First, when target slip amount TSLIP, calculated at step S3 satisfies the condition defined by the inequality lower limit≤TSLIP≤upper limit, in the flowchart of FIG. 2, the flow of step S1→step S2→step S3→step S4→step S6→step S8→RETURN is repeatedly executed. During subsequent executions, at step S8, target slip amount TSLIP is determined as the target slip amount TSLIP calculated at step S3.

Secondly, when target slip amount TSLIP, calculated at step S3 satisfies the condition defined by the inequality TSLIP>upper limit, in the flowchart of FIG. 2, the flow of step S1→step S2→step S3→step S4→step S5→RETURN is repeatedly executed. During subsequent executions, at step S5, target slip amount TSLIP is determined as the upper limit, set depending on the magnitude of engine torque Te.

Thirdly, when target slip amount TSLIP, calculated at step S3 satisfies the condition defined by the inequality TSLIP<lower limit, in the flowchart of FIG. 2, the flow of step S1→step S2→step S3→step S4→step S6→step S7→RETURN is repeatedly executed. During subsequent executions, at step S7, target slip amount TSLIP is determined as the lower limit (zero).

In the foregoing manner, the upper limit on the target slip amount TSLIP of lockup clutch 8 is placed. Also, the upper limit is set to increase, as engine torque Te (i.e., the output from engine 2 to torque converter 1) increases. Hence, it is possible to suppress the actual slip amount of lockup clutch 8 from becoming excessively large. Furthermore, the upper limit is set based on the engine torque Te corresponding to an output from engine 2 to torque converter 1, and thus it is possible to achieve a suitable slip amount such that target slip amount TSLIP increases as the output from engine 2 to torque converter 1 increases.

Moreover, the lower limit on the target slip amount TSLIP of lockup clutch 8 is placed. Also, the lower limit is set to zero. Hence, there is no risk that the engagement capacity of lockup clutch 8 becomes excessively large due to the target slip amount TSLIP, which has been undesirably set to a negative value. Accordingly, it is possible to improve the responsiveness when shifting the lockup clutch 8 to a slip lock-up state.

The effects are hereunder explained.

The automatic transmission control device of the first embodiment can provide the effects enumerated as follows.

(1) In a device for controlling an automatic transmission employing a torque converter 1 interposed between a driving power source (engine 2) of a vehicle and an automatic transmission 3, a lockup clutch 8 provided to permit a driving-power-source side (the side of engine 2) of the torque converter 1 to engage with an automatic-transmission side (the side of automatic transmission 3) of the torque converter, and a slip lockup control means (controller 10) for executing control by which an actual slip amount of the lockup clutch 8 corresponding to a rotational speed difference between the driving-power-source side (the side of engine 2) and the automatic-transmission side (the side of automatic transmission 3) is brought to a target slip amount, also provided is a target slip addition amount calculation means configured to:

calculate a negative value as an addition amount ΔTslip of the target slip amount, when a rate of change in an output from the driving power source to the torque converter (i.e., engine torque change rate ΔTe) is less than or equal to a predetermined value that is a positive value, and calculate a positive value as the addition amount ΔTslip, when the rate of change in the output (i.e., engine torque change rate ΔTe) is greater than the predetermined value, wherein:

the slip lockup control means (controller 10) is configured to set the target slip amount TSLIP of the lockup clutch 8 by arithmetic processing that integrates the addition amount ΔTslip, determined based on the rate of change in the output (i.e., engine torque change rate ΔTe), every control period (step S3 of FIG. 2).

Hence, it is possible to impart a suitable target slip amount TSLIP depending on a state of change in the output from the driving power source to the torque converter (i.e., engine torque Te), while simplifying control.

(2) The target slip addition amount calculation means (step S2 of FIG. 2) is configured to:

calculate a negative fixed value as the addition amount ΔTslip, when the rate of change in the output (the engine torque change rate ΔTe) is less than or equal to a first predetermined value ΔTe1, calculate a positive value that increases in proportion to an increase in the rate of change in the output (the engine torque change rate ΔTe) as the addition amount ΔTslip, when the rate of change in the output (the engine torque change rate ΔTe) exists between the first predetermined value ΔTe1 and a second predetermined value ΔTe2 greater than the first predetermined value, and calculate a maximum value that is a positive fixed value as the addition amount ΔTslip, when the rate of change in the output (the engine torque change rate ΔTe) is greater than or equal to the second predetermined value ΔTe2.

Hence, in addition to the effect recited in the item (1), it is possible to finely precisely calculate the addition amount ΔTslip that determines an incremental gradient or a decremental gradient of the target slip amount TSLIP depending on the driver's wishes for driving power.

(3) The slip lockup control means (controller 10) is further configured to:

set an upper limit of the target slip amount TSLIP of the lockup clutch 8 such that the upper limit increases as the output from the driving power source to the torque converter (i.e., engine torque Te) increases (steps S4, S5 of FIG. 2).

Hence, in addition to the effects recited in the items (1) or (2), it is possible to suppress the actual slip amount of lockup clutch 8 from becoming excessively large. Additionally, it is possible to achieve a suitable slip amount such that target slip amount TSLIP increases as the output (i.e., engine torque Te) increases.

(4) The slip lockup control means (controller 10) is further configured to:

set a lower limit of the target slip amount TSLIP of the lockup clutch 8 to zero (steps S6, S7 of FIG. 2).

Hence, in addition to the effects recited in the items (1) to (3), there is no risk that the engagement capacity of lockup clutch 8 becomes excessively large due to the target slip amount TSLIP, which has been undesirably set to a negative value. Accordingly, it is possible to improve the responsiveness when shifting the lockup clutch 8 to a slip lock-up state.

While the foregoing is a description of the preferred embodiments carried out the automatic transmission control device of the invention with reference to the first embodiment, it will be understood that the invention is not limited to the particular embodiments, that is, the first embodiment, shown and described herein, but that various changes and modifications may be made without departing from the scope or spirit of this invention as defined by the following claims.

In the first embodiment, as seen from the addition amount map of FIG. 3, the first predetermined value ΔTe1 and the second predetermined value ΔTe2 are both set. Exemplified is the target slip addition amount calculation means that calculates or acquires a suitable addition amount ΔTslip for each of three areas divided by these two predetermined values ΔTe1, ΔTe2. In lieu thereof, the target slip addition amount calculation means may be modified as follows.

That is, only one predetermined value is set. The target slip addition amount calculation means is configured to:

calculate a negative value as an addition amount, when a rate of change in an output from a driving power source to a torque converter is a positive change rate and less than or equal to a predetermined value, and calculate a positive value (a fixed value or a variable value) as the addition amount, when the rate of change in the output is greater than the predetermined value. Furthermore, instead of map-retrieving the addition amount from the addition amount map, the addition amount may be arithmetically calculated or derived from an addition-amount arithmetic expression.

Exemplified in the first embodiment is the automatic transmission control device of the invention which is applied to an engine vehicle. In lieu thereof, the automatic transmission control device of the invention may be applied to any vehicle equipped with a lockup clutch, for instance, a hybrid vehicle, employing both an engine and a motor, and the like.

The invention claimed is:

1. A device for controlling an automatic transmission employing a torque converter interposed between a driving power source of a vehicle and an automatic transmission, a lockup clutch provided to permit a driving-power-source side of the torque converter to engage with an automatic-transmission side of the torque converter, and a slip lockup control means for executing control by which an actual slip amount of the lockup clutch corresponding to a rotational speed difference between the driving-power-source side and the automatic-transmission side is brought to a target slip amount, comprising:

a target slip addition amount calculation means configured to:

calculate a negative value as an addition amount of the target slip amount, when a rate of change in an output from the driving power source to the torque converter is less than or equal to a predetermined value that is a positive value, and calculate a positive value as the addition amount, when the rate of change in the output is greater than the predetermined value, wherein:

the slip lockup control means is configured to set the target slip amount of the lockup clutch by arithmetic processing that integrates the addition amount, determined based on the rate of change in the output, every control period.

2. A device for controlling an automatic transmission as claimed in claim 1, wherein:

the target slip addition amount calculation means is configured to:

calculate a negative fixed value as the addition amount, when the rate of change in the output is less than or equal to a first predetermined value, calculate a positive value that increases in proportion to an increase in the rate of change in the output as the addition amount, when the rate of change in the output exists between the first predetermined value and a second predetermined value greater than the first predetermined value, and calculate a maximum value that is a positive fixed value as the addition amount, when the rate of change in the output is greater than or equal to the second predetermined value.

3. A device for controlling an automatic transmission as claimed in claim 2, wherein:

the slip lockup control means is further configured to:

set an upper limit of the target slip amount of the lockup clutch such that the upper limit increases as the output from the driving power source to the torque converter increases.

4. A device for controlling an automatic transmission as claimed in claim 3, wherein:
the slip lockup control means is further configured to:
set a lower limit of the target slip amount of the lockup clutch to zero.

5. A device for controlling an automatic transmission employing a torque converter interposed between a driving power source of a vehicle and an automatic transmission, a lockup clutch provided to permit a driving-power-source side of the torque converter to engage with an automatic-transmission side of the torque converter, and a slip lockup control unit configured to execute control by which an actual slip amount of the lockup clutch corresponding to a rotational speed difference between the driving-power-source side and the automatic-transmission side is brought to a target slip amount, comprising:
a target slip addition amount calculation part configured to:
calculate a negative value as an addition amount of the target slip amount, when a rate of change in an output from the driving power source to the torque converter is less than or equal to a predetermined value that is a positive value, and
calculate a positive value as the addition amount, when the rate of change in the output is greater than the predetermined value, wherein:
the slip lockup control unit is configured to set the target slip amount of the lockup clutch by arithmetic processing that integrates the addition amount, determined based on the rate of change in the output, every control period.

6. A device for controlling an automatic transmission as claimed in claim 5, wherein:
the target slip addition amount calculation part is configured to:
calculate a negative fixed value as the addition amount, when the rate of change in the output is less than or equal to a first predetermined value,
calculate a positive value that increases in proportion to an increase in the rate of change in the output as the addition amount, when the rate of change in the output exists between the first predetermined value and a second predetermined value greater than the first predetermined value, and
calculate a maximum value that is a positive fixed value as the addition amount, when the rate of change in the output is greater than or equal to the second predetermined value.

7. A device for controlling an automatic transmission as claimed in claim 6, wherein:
the slip lockup control unit is further configured to:
set an upper limit of the target slip amount of the lockup clutch such that the upper limit increases as the output from the driving power source to the torque converter increases.

8. A device for controlling an automatic transmission as claimed in claim 7, wherein:
the slip lockup control unit is further configured to:
set a lower limit of the target slip amount of the lockup clutch to zero.

* * * * *